United States Patent
Kurita et al.

(10) Patent No.: US 10,916,799 B2
(45) Date of Patent: Feb. 9, 2021

(54) METHOD FOR PRODUCING POSITIVE ELECTRODE MATERIAL

(71) Applicant: FUJITSU LIMITED, Kawasaki (JP)

(72) Inventors: Tomochika Kurita, Kawasaki (JP); Jiyunichi Iwata, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 15/947,973

(22) Filed: Apr. 9, 2018

(65) Prior Publication Data

US 2018/0316047 A1 Nov. 1, 2018

(30) Foreign Application Priority Data

Apr. 27, 2017 (JP) .................................. 2017-088535

(51) Int. Cl.
| | |
|---|---|
| *H01M 10/0525* | (2010.01) |
| *H01M 10/0569* | (2010.01) |
| *H01M 2/02* | (2006.01) |
| *H01M 4/40* | (2006.01) |
| *H01M 4/04* | (2006.01) |
| *H01M 4/66* | (2006.01) |
| *H01M 4/38* | (2006.01) |
| *H01M 4/36* | (2006.01) |
| *H01M 4/136* | (2010.01) |
| *H01M 4/1397* | (2010.01) |

(Continued)

(52) U.S. Cl.
CPC ..... *H01M 10/0525* (2013.01); *H01M 2/0202* (2013.01); *H01M 4/0471* (2013.01); *H01M 4/136* (2013.01); *H01M 4/1397* (2013.01); *H01M 4/364* (2013.01); *H01M 4/38* (2013.01); *H01M 4/405* (2013.01); *H01M 4/5825* (2013.01); *H01M 4/661* (2013.01); *H01M 10/0569* (2013.01); *H01M 2004/027* (2013.01); *H01M 2004/028* (2013.01); *H01M 2300/0028* (2013.01)

(58) Field of Classification Search
CPC ..... H01M 4/0471; H01M 4/58; H01M 4/5825
See application file for complete search history.

(56) References Cited

U.S. PATENT DOCUMENTS

| | | | |
|---|---|---|---|
| 2011/0236757 A1 | 9/2011 | Yukawa et al. | |
| 2015/0303470 A1* | 10/2015 | Honma | H01M 4/5825 429/221 |

FOREIGN PATENT DOCUMENTS

| | | |
|---|---|---|
| JP | 2002-246025 | 8/2002 |
| JP | 2011-222498 | 11/2011 |
| JP | 2014-86195 | 5/2014 |

OTHER PUBLICATIONS

T. Kurita et al., "A New Lithium Iron Pyrophosphate Material with Abnormally High Voltage Approaching to 3.8 V", 231st ECS Meeting, May-Jun. 2017, Internet <https://ecs.confex.com/ecs/231/webprogram/Paper96771.html> (2 pages).

* cited by examiner

*Primary Examiner* — Barbara L Gilliam
*Assistant Examiner* — Nathanael T Zemui
(74) *Attorney, Agent, or Firm* — Fujitsu Patent Center

(57) ABSTRACT

A positive electrode material for a secondary battery, includes: a composition represented by $Li_{4+x}Fe_{4+y}(P_2O_7)_3$ ($-0.80 \leq x \leq 0.60$, $-0.30 \leq y \leq 0.40$, and $-0.30 \leq x+y \leq 0.30$); and tungsten, wherein the positive electrode material has a triclinic crystal structure.

4 Claims, 9 Drawing Sheets

(51) Int. Cl.
*H01M 4/58* (2010.01)
*H01M 4/02* (2006.01)

METHOD FOR PRODUCING POSITIVE ELECTRODE MATERIAL

CROSS-REFERENCE TO RELATED APPLICATION

This application is based upon and claims the benefit of priority of the prior Japanese Patent Application No. 2017-88535, filed on Apr. 27, 2017, the entire contents of which are incorporated herein by reference.

FIELD

The embodiments discussed herein are related to a positive electrode material for a secondary battery and a method for producing the positive electrode material for a secondary battery, and a lithium ion secondary battery that uses the positive electrode material for secondary batteries.

BACKGROUND

Secondary batteries having a high energy density have been used as storage batteries for cellular phones, mobile personal computers, sensing devices, electric vehicles, and the like.

The related art is disclosed in Japanese Laid-open Patent Publication No. 2011-222498 and T. Kurita, J. I. Iwata, T. Yamamoto, and S. Sato, "A New Lithium Iron Pyrophosphate Material with Abnormally High Voltage Approaching to 3.8 V", 231st ECS Meeting Conference Abstracts, https://ecs.confex.com/ecs/231/webprogram/Paper96771.html (Non-Patent Document).

SUMMARY

According to an aspect of the embodiments, a positive electrode material for a secondary battery, includes: a composition represented by $Li_{4+x}Fe_{4+y}(P_2O_7)_3$ ($-0.80 \leq x \leq 0.60$, $-0.30 \leq y \leq 0.40$, and $-0.30 \leq x+y \leq 0.30$); and tungsten, wherein the positive electrode material has a triclinic crystal structure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
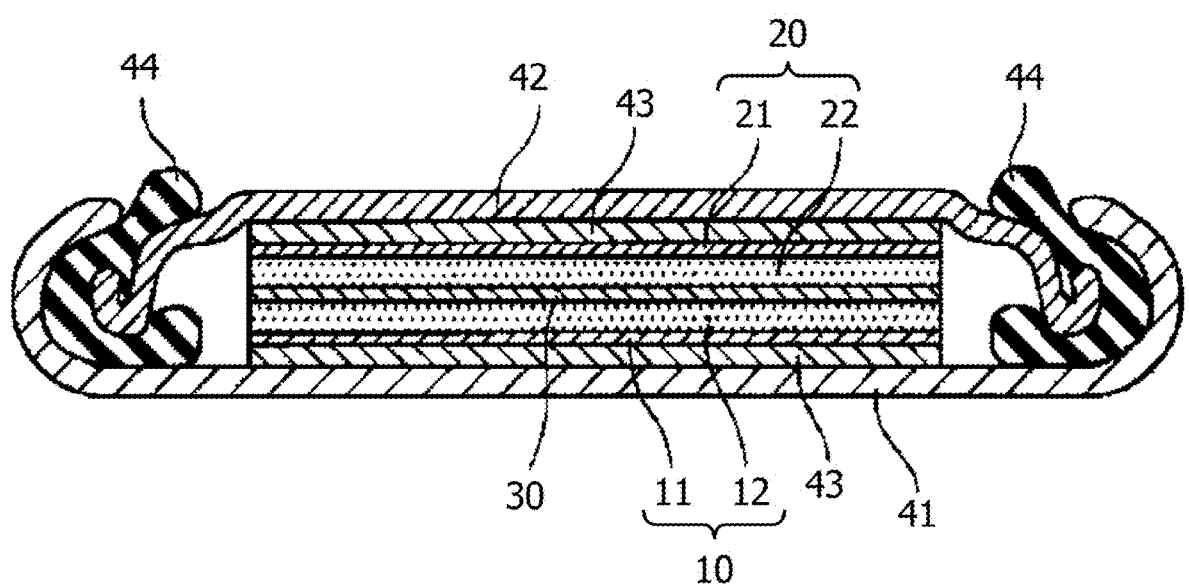
FIG. 1 illustrates an example of a section of a lithium ion secondary battery.

An example of a secondary battery is a lithium ion secondary battery.

A lithium ion secondary battery includes a positive electrode containing a positive electrode active material that causes an oxidation-reduction reaction and a negative electrode containing a negative electrode active material that causes an oxidation-reduction reaction. As a result of the chemical reaction, the positive electrode active material and the negative electrode active material release energy. By extracting the released energy as electric energy, the lithium ion secondary battery carries out its function.

The maximum driving power and the driving time of devices such as sensing devices are highly affected by the energy density of a positive electrode material in a battery. One of methods for providing a positive electrode material having a high energy density is to use a positive electrode material having a high potential.

Examples of the positive electrode material include $LiCoO_2$ (3.6 V to 3.7 V), $LiMn_2O_4$ (3.7 V to 3.8 V), and $LiFePO_4$ (3.3 V to 3.4 V). Among them, $LiCoO_2$ and $LiMn_2O_4$ increase the cost of the positive electrode material because cobalt (Co) and manganese (Mn) serving as raw materials are expensive elements. $LiFePO_4$ does not considerably increase the cost of the positive electrode material because iron, which is an inexpensive element, is used as a raw material, but has a lower potential than $LiCoO_2$ and $LiMn_2O_4$.

For example, a new lithium ion pyrophosphate material having a high potential of 3.8 V may be provided.

A positive electrode material for secondary batteries that is represented by composition formula $Li_{4+x}Fe_{4+y}(P_2O_7)_3$ ($-0.80 \leq x \leq 0.60$, $-0.30 \leq y \leq 0.40$, and $-0.30 \leq x+y \leq 0.30$) and has a triclinic crystal structure is an inexpensive positive electrode material for secondary batteries that has a potential as high as that of $LiCoO_2$.

The positive electrode material for secondary batteries desirably has a high potential and also an excellent charge-discharge capacity.

There may be provided an inexpensive positive electrode material for secondary batteries that has a potential as high as that of $LiCoO_2$ and also has an excellent charge-discharge capacity.

The positive electrode material for secondary batteries has a composition represented by $Li_{4+x}Fe_{4+y}(P_2O_7)_3$ ($-0.80 \leq x \leq 0.60$, $-0.30 \leq y \leq 0.40$, and $-0.30 \leq x+y \leq 0.30$) and further contains tungsten (W). The positive electrode material for secondary batteries has a triclinic crystal structure. The positive electrode material for secondary batteries preferably belongs to space group P-1.

$LiCoO_2$ (3.6 V to 3.7 V) and $LiMn_2O_4$ (3.7 V to 3.8 V), which are positive electrode materials having a relatively high potential, increase the cost of the positive electrode material because $LiCoO_2$ and $LiMn_2O_4$ contain cobalt (Co) and manganese (Mn), which are expensive elements, respectively. On the other hand, $LiFePO_4$ does not considerably increase the cost of the positive electrode material because $LiFePO_4$ contains iron, which is an inexpensive element, as a raw material, but has a lower potential (3.3 V to 3.4 V) than $LiCoO_2$ and $LiMn_2O_4$.

For example, an inexpensive positive electrode material for secondary batteries that has a potential as high as that of $LiCoO_2$ (3.6 V to 3.7 V) may be provided. For example, there may be provided a positive electrode material for secondary batteries that is represented by composition formula $Li_{4+x}Fe_{4+y}(P_2O_7)_3$ ($-0.80 \leq x \leq 0.60$, $-0.30 \leq y \leq 0.40$, and $-0.30 \leq x+y \leq 0.30$) and has a triclinic crystal structure. The positive electrode material for secondary batteries is inexpensive because the constituent element is Fe, which is an inexpensive element. Furthermore, the positive electrode material for secondary batteries has a potential as high as that of $LiCoO_2$ (3.6 V to 3.7 V).

For example, the charge-discharge capacity of the positive electrode material for secondary batteries may be further improved. For example, the addition of tungsten (W) to the positive electrode material for secondary batteries provides a positive electrode material for secondary batteries that has a potential as high as that of $LiCoO_2$ despite the fact that inexpensive iron is used and that has an excellent charge-discharge capacity. For example, a positive electrode material for secondary batteries that has a composition represented by $Li_{4+x}Fe_{4+y}(P_2O_7)_3$ ($-0.80 \leq x \leq 0.60$, $-0.30 \leq y \leq 0.40$, and $-0.30 \leq x+y \leq 0.30$), further contains W, and has a triclinic crystal structure may be provided as a positive electrode material for secondary batteries that has a potential as high as that of $LiCoO_2$ despite the fact that inexpensive iron is used and that has an excellent charge-discharge capacity.

In the above composition formula, the range of x is $-0.80 \leq x \leq 0.60$, preferably $-0.55 \leq x \leq 0.50$, more preferably $-0.25 \leq x \leq 0.20$, further preferably $-0.10 \leq x \leq 0.10$, and particularly preferably $-0.05 \leq x \leq 0.05$. In the above composition formula, the range of y is $-0.30 \leq y \leq 0.40$, preferably $-0.25 \leq y \leq 0.28$, more preferably $-0.10 \leq y \leq 0.13$, further preferably $-0.05 \leq y \leq 0.05$, and particularly preferably $-0.03 \leq y \leq 0.03$. In the above composition formula, the range of x+y is $-0.30 \leq x+y \leq 0.30$, preferably $-0.28 \leq x+y \leq 0.25$, more preferably $-0.13 \leq x+y \leq 0.10$, further preferably $-0.05 \leq x+y \leq 0.05$, and particularly preferably $-0.03 \leq x+y \leq 0.03$. When $x=0.00$ and $y=0.00$ is satisfied in $Li_{4+x}Fe_{4+y}(P_2O_7)_3$, $Li_4Fe_4(P_2O_7)_3$ is given. $Li_4Fe_4(P_2O_7)_3$ may also be represented by $Li_{5.33}Fe_{5.33}(P_2O_7)_4$.

The tungsten (W) content in the positive electrode material for secondary batteries is not particularly limited and may be appropriately selected in accordance with the purpose. The W content is preferably 0.08 mass % or more and 5.00 mass % or less and more preferably 0.08 mass % or more and 2.00 mass % or less. The W content can be determined by, for example, inductively coupled plasma (ICP) analysis.

In the positive electrode material for secondary batteries, W may be present in the triclinic crystal structure or may be present outside the triclinic crystal structure.

In the positive electrode material for secondary batteries, the W content and the charge-discharge capacity estimated from the oxidation-reduction reaction ($W \leftrightarrow W^{6+}$) of W at the W content have no correlation. In the positive electrode material for secondary batteries, therefore, W may have an effect of stabilizing the crystal structure.

The method for producing a positive electrode material for secondary batteries is not particularly limited and may be appropriately selected in accordance with the purpose, but is preferably the following method for producing a positive electrode material for secondary batteries.

The method for producing a positive electrode material for secondary batteries disclosed herein includes at least a heat treatment step and may further optionally include other steps such as a mixing step.

The mixing step (first aspect) may be any step of mixing a lithium source, an iron source, and a phosphoric acid source in a container containing a tungsten source to produce a mixture. The mixing step may be appropriately selected in accordance with the purpose and may be performed by using, for example, a ball mill. An example of the ball mill is a planetary ball mill. In the mixing step, a trace amount of tungsten source comes off from the container and mixes with the mixture.

The container containing a tungsten source is not particularly limited as long as the surface inside the container contains the tungsten source, and may be appropriately selected in accordance with the purpose. An example of the container is a container made of tungsten carbide. An example of the tungsten source is tungsten carbide.

An example of the lithium source is a lithium salt. An anion constituting the lithium salt is not particularly limited and may be appropriately selected in accordance with the purpose. Examples of the anion include a hydroxide ion, a carbonate ion, an oxalate ion, an acetate ion, a nitrate anion, a sulfate anion, a phosphate ion, a fluoride ion, a chloride ion, a bromide ion, and an iodide ion. These anions may be used alone or in combination of two or more. The lithium salt is not particularly limited and may be appropriately selected in accordance with the purpose. Examples of the lithium salt include lithium hydroxide (LiOH), lithium carbonate ($Li_2CO_3$), lithium nitrate ($LiNO_3$), lithium sulfate ($Li_2SO_4$), lithium perchlorate ($LiClO_4$), lithium hexafluorophosphate ($LiPF_6$), and lithium tetrafluoroborate ($LiBF_4$). These lithium salts may be hydrates or anhydrides. In particular, lithium carbonate and lithium nitrate are preferred because a side reaction does not occur.

An example of the iron source is an iron salt. An anion constituting the iron salt is not particularly limited and may be appropriately selected in accordance with the purpose. Examples of the anion include an oxide ion, a carbonate ion, an oxalate ion, an acetate ion, a nitrate anion, a sulfate anion, a phosphate ion, a fluoride ion, a chloride ion, a bromide ion, and an iodide ion. These anions may be used alone or in combination of two or more. The iron salt is not particularly limited and may be appropriately selected in accordance with the purpose. Examples of the iron salt include ferrous oxide, iron(II) oxalate, iron(II) nitrate, iron(II) sulfate, and iron(II) chloride. These iron salts may be hydrates or anhydrides.

Examples of the phosphoric acid source include phosphoric acid and phosphates. A cation constituting the phosphate is not particularly limited and may be appropriately selected in accordance with the purpose. An example of the cation is an ammonium ion. Examples of the phosphate include ammonium phosphate, ammonium dihydrogen phosphate, and diammonium hydrogen phosphate.

Instead of the lithium source and the phosphoric acid source, for example, lithium phosphate, dilithium hydrogen phosphate, and lithium dihydrogen phosphate may be used as compounds that serve as a lithium source and a phosphoric acid source.

The ratio of the lithium source, the iron source, and the phosphoric acid source in the mixing is not particularly limited and may be appropriately selected in accordance with the purpose. For example, the ratio is Li:Fe:P=3.2 to 4.6:3.7 to 4.4:6.0 (element ratio).

The mixing time is not particularly limited and may be appropriately selected in accordance with the purpose. The mixing time is, for example, 1 hour or more and 36 hours or less. The agitation speed of the ball mill is not particularly limited and may be selected in accordance with the purpose.

The agitation speed is, for example, 100 rpm or more and 1,000 rpm or less. The amount of the tungsten source in the mixture may be controlled by changing the mixing conditions.

In the mixing step (second aspect), the step of mixing a lithium source, an iron source, a phosphoric acid source, and a tungsten source to produce a mixture is not particularly limited and may be appropriately selected in accordance with the purpose. For example, a ball mill may be used. An example of the ball mill is a planetary ball mill.

The lithium source is not particularly limited and may be appropriately selected in accordance with the purpose. Examples of the lithium source include the lithium sources exemplified in the mixing step (first aspect). The iron source is not particularly limited and may be appropriately selected in accordance with the purpose. Examples of the iron source include the iron sources exemplified in the mixing step (first aspect). The phosphoric acid source is not particularly limited and may be appropriately selected in accordance with the purpose. Examples of the phosphoric acid source include the phosphoric acid sources exemplified in the mixing step (first aspect).

The tungsten source is not particularly limited and may be appropriately selected in accordance with the purpose. Examples of the tungsten source include tungsten carbide, tungsten, tungsten boride, tungsten sulfide, tungsten trioxide, tungsten selenide, and tungsten silicide.

The amount of the tungsten source added in the mixing is not particularly limited and may be appropriately selected in accordance with the purpose.

The ratio of the lithium source, the iron source, and the phosphoric acid source in the mixing is not particularly limited and may be appropriately selected in accordance with the purpose. For example, the ratio is Li:Fe:P=3.2 to 4.6:3.7 to 4.4:6.0 (element ratio).

The mixing time is not particularly limited and may be appropriately selected in accordance with the purpose. The mixing time is, for example, 1 hour or more and 36 hours or less. The agitation speed in the ball mill is not particularly limited and may be appropriately selected in accordance with the purpose. The agitation speed is, for example, 100 rpm or more and 1,000 rpm or less.

The heat treatment step is not particularly limited as long as the mixture is heat-treated and may be appropriately selected in accordance with the purpose. The mixture is a mixture of a lithium source, an iron source, a phosphoric acid source, and a tungsten source. The heat treatment temperature is not particularly limited and may be appropriately selected in accordance with the purpose. The heat treatment temperature is preferably 470° C. or higher and 720° C. or lower and more preferably 500° C. or higher and 650° C. or lower. If the heat treatment temperature is lower than 470° C., a desired crystal structure is sometimes not obtained. If the heat treatment temperature is higher than 720° C., the resulting product may be melted. The heat treatment time is not particularly limited and may be appropriately selected in accordance with the purpose. The heat treatment time is preferably 1 hour or more and 24 hours or less, more preferably 2 hours or more and 18 hours or less, and particularly preferably 3 hours or more and 15 hours or less. The heat treatment is preferably performed in an inert atmosphere such as an argon atmosphere.

A lithium ion secondary battery includes at least the positive electrode material for secondary batteries disclosed herein and may further optionally include other members. A method for producing a lithium ion secondary battery is a method for producing the lithium ion secondary battery, and includes the steps in the method for producing a positive electrode material for secondary batteries and may further optionally include other steps.

The lithium ion secondary battery contains the positive electrode material for secondary batteries that is inexpensive and has a potential as high as that of $LiCoO_2$, which exhibits a relatively high potential. For example, a high potential contributes to a high energy density. Therefore, the lithium ion secondary battery is an inexpensive lithium ion secondary battery having a high energy density.

For example, the lithium ion secondary battery includes at least a positive electrode and may further optionally include other members such as a negative electrode, an electrolyte, a separator, a positive electrode case, and a negative electrode case.

The positive electrode contains at least a positive electrode material for secondary batteries and may further optionally include other members such as a positive electrode current collector.

In the positive electrode, the positive electrode material for secondary batteries functions as a so-called positive electrode active material. The content of the positive electrode material for secondary batteries in the positive electrode is not particularly limited and may be appropriately selected in accordance with the purpose. In the positive electrode, the positive electrode material for secondary batteries may be mixed with a conductive material and a binder material to form a positive electrode layer. The conductive material is not particularly limited and may be appropriately selected in accordance with the purpose. An example of the conductive material is a carbon-based conductive material. Examples of the carbon-based conductive material include acetylene black and carbon black. The binder material is not particularly limited and may be appropriately selected in accordance with the purpose. Examples of the binder material include polytetrafluoroethylene (PTFE), polyvinylidene fluoride (PVDF), ethylene-propylene-butadiene rubber (EPBR), styrene-butadiene rubber (SBR), and carboxymethyl cellulose (CMC).

The material, size, and structure of the positive electrode are not particularly limited and may be appropriately selected in accordance with the purpose. The shape of the positive electrode is not particularly limited and may be appropriately selected in accordance with the purpose. Examples of the shape of the positive electrode include a rod-like shape and a disc-like shape.

The shape, size, and structure of the positive electrode current collector are not particularly limited and may be appropriately selected in accordance with the purpose. The material for the positive electrode current collector is not particularly limited and may be appropriately selected in accordance with the purpose. Examples of the material for the positive electrode current collector include stainless steel, aluminum, copper, and nickel.

The positive electrode current collector is used for achieving a good electrical connection of the positive electrode layer to a positive electrode case serving as a terminal.

The negative electrode contains at least a negative electrode active material and may further optionally include other members such as a negative electrode current collector.

The size and structure of the negative electrode are not particularly limited and may be appropriately selected in accordance with the purpose. The shape of the negative electrode is not particularly limited and may be appropriately selected in accordance with the purpose. Examples of the shape of the negative electrode include a rod-like shape and a disc-like shape.

The negative electrode active material is not particularly limited and may be appropriately selected in accordance with the purpose. An example of the negative electrode active material is a compound containing an alkali metal element. Examples of the compound containing an alkali metal element include elemental metals, alloys, metal oxides, and metal nitrides. An example of the alkali metal element is lithium. An example of the elemental metal is lithium. An example of the alloy is an alloy containing lithium. Examples of the alloy containing lithium include a lithium-aluminum alloy, a lithium-tin alloy, a lithium-lead alloy, and a lithium-silicon alloy. An example of the metal oxide is a metal oxide containing lithium. An example of the metal oxide containing lithium is lithium titanium oxide. An example of the metal nitride is a metal nitride containing lithium. Examples of the metal nitride containing lithium include lithium cobalt nitride, lithium iron nitride, and lithium manganese nitride.

The content of the negative electrode active material in the negative electrode is not particularly limited and may be appropriately selected in accordance with the purpose.

In the negative electrode, the negative electrode active material may be mixed with a conductive material and a binder material to form a negative electrode layer. The conductive material is not particularly limited and may be appropriately selected in accordance with the purpose. An example of the conductive material is a carbon-based conductive material. Examples of the carbon-based conductive material include acetylene black and carbon black. The binder material is not particularly limited and may be appropriately selected in accordance with the purpose. Examples of the binder material include polytetrafluoroethylene (PTFE), polyvinylidene fluoride (PVDF), ethylene-propylene-butadiene rubber (EPBR), styrene-butadiene rubber (SBR), and carboxymethyl cellulose (CMC).

The shape, size, and structure of the negative electrode current collector are not particularly limited and may be appropriately selected in accordance with the purpose. The material for the negative electrode current collector is not particularly limited and may be appropriately selected in accordance with the purpose. Examples of the material for the negative electrode current collector include stainless steel, aluminum, copper, and nickel.

The negative electrode current collector is used for achieving a good electrical connection of the negative electrode layer to a negative electrode case serving as a terminal.

The electrolyte is not particularly limited and may be appropriately selected in accordance with the purpose. Examples of the electrolyte include a nonaqueous electrolytic solution and a solid electrolyte.

An example of the nonaqueous electrolytic solution is a nonaqueous electrolytic solution containing a lithium salt and an organic solvent.

The lithium salt is not particularly limited and may be appropriately selected in accordance with the purpose. Examples of the lithium salt include lithium hexafluorophosphate, lithium tetrafluoroborate, lithium perchlorate, lithium bis(pentafluoroethanesulfone)imide, and lithium bis(trifluoromethanesulfone)imide. These lithium salts may be used alone or in combination of two or more.

The concentration of the lithium salt is not particularly limited and may be appropriately selected in accordance with the purpose. The concentration of the lithium salt in the organic solvent is preferably 0.5 mol/L or more and 3 mol/L or less from the viewpoint of ionic conductivity.

The organic solvent is not particularly limited and may be appropriately selected in accordance with the purpose. Examples of the organic solvent include ethylene carbonate, dimethyl carbonate, propylene carbonate, diethyl carbonate, and ethyl methyl carbonate. These organic solvents may be used alone or in combination of two or more.

The content of the organic solvent in the nonaqueous electrolytic solution is not particularly limited and may be appropriately selected in accordance with the purpose. The content of the organic solvent is preferably 75 mass % or more and 95 mass % or less and more preferably 80 mass % or more and 90 mass % or less. If the content of the organic solvent is less than 75 mass %, the viscosity of the nonaqueous electrolytic solution increases and the wettability of the nonaqueous electrolytic solution to the electrodes deteriorates, which may increase the internal resistance of the battery. If the content of the organic solvent is more than 95 mass %, the ionic conductivity decreases, which may reduce the power of the battery. The content of the organic solvent advantageously falls within the more preferable range because high ionic conductivity is maintained, and an increase in the viscosity of the nonaqueous electrolytic solution is suppressed and thus the wettability of the nonaqueous electrolytic solution to the electrodes is maintained.

The solid electrolyte is not particularly limited and may be appropriately selected in accordance with the purpose. Examples of the solid electrolyte include inorganic solid electrolytes and solvent-free polymer electrolytes. Examples of the inorganic solid electrolyte include LISICON materials and perovskite materials. An example of the solvent-free polymer electrolyte is a polymer having an ethylene oxide bond.

The content of the electrolyte in the lithium ion secondary battery is not particularly limited and may be appropriately selected in accordance with the purpose.

The material for the separator is not particularly limited and may be appropriately selected in accordance with the purpose. Examples of the material for the separator include paper, cellophane, polyolefin nonwoven fabric, polyamide nonwoven fabric, and glass fiber nonwoven fabric. Examples of the paper include kraft paper, vinylon mixed paper, and synthetic pulp mixed paper. The shape of the separator is not particularly limited and may be appropriately selected in accordance with the purpose. For example, a sheet-like shape is employed. The separator may have a single-layer structure or a multilayer structure. The size of the separator is not particularly limited and may be appropriately selected in accordance with the purpose.

The material for the positive electrode case is not particularly limited and may be appropriately selected in accordance with the purpose. Examples of the material for the positive electrode case include copper, stainless steel, and stainless steel or iron coated with nickel or the like. The shape of the positive electrode case is not particularly limited and may be appropriately selected in accordance with the purpose. Examples of the shape of the positive electrode case include a shallow dish-like shape with edges curved upward, a cylindrical shape with a closed bottom, and a prismatic shape with a closed bottom. The positive electrode case may have a single-layer structure or a multilayer structure. The multilayer structure is, for example, a three-layer structure constituted by nickel, stainless steel, and copper. The size of the positive electrode case is not particularly limited and may be appropriately selected in accordance with the purpose.

The material for the negative electrode case is not particularly limited and may be appropriately selected in accordance with the purpose. Examples of the material for the negative electrode case include copper, stainless steel, and stainless steel or iron coated with nickel or the like. The shape of the negative electrode case is not particularly limited and may be appropriately selected in accordance with the purpose. Examples of the shape of the negative electrode case include a shallow dish-like shape with edges curved upward, a cylindrical shape with a closed bottom, and a prismatic shape with a closed bottom. The negative electrode case may have a single-layer structure or a multilayer structure. The multilayer structure is, for example, a three-layer structure constituted by nickel, stainless steel, and copper. The size of the negative electrode case is not particularly limited and may be appropriately selected in accordance with the purpose.

The shape of the lithium ion secondary battery is not particularly limited and may be appropriately selected in accordance with the purpose. Examples of the shape of the lithium ion secondary battery include a coin-like shape, a cylindrical shape, a rectangular shape, and a sheet-like shape.

FIG. 1 illustrates an example of a section of a lithium ion secondary battery. The lithium ion secondary battery illustrated in FIG. 1 is a coin-shaped lithium ion secondary battery. The coin-shaped lithium ion secondary battery includes a positive electrode 10 constituted by a positive electrode current collector 11 and a positive electrode layer 12, a negative electrode 20 constituted by a negative electrode current collector 21 and a negative electrode layer 22, and an electrolyte layer 30 interposed between the positive electrode 10 and the negative electrode 20. In the lithium ion secondary battery in FIG. 1, the positive electrode current collector 11 is fixed to a positive electrode case 41 with a current collector 43 interposed therebetween, and the negative electrode current collector 21 is fixed to a negative electrode case 42 with a current collector 43 interposed therebetween. A space between the positive electrode case 41 and the negative electrode case 42 is filled with, for example, a polypropylene gasket 44 for sealing. The current collectors 43 are used for achieving electrical connections and filling gaps between the positive electrode current collector 11 and the positive electrode case 41 and between the negative electrode current collector 21 and the negative electrode case 42. The positive electrode layer 12 may be produced by using, for example, the above-described positive electrode material for secondary batteries.

For example, the following raw materials may be available from manufacturers below.

$Li_2CO_3$: Kojundo Chemical Laboratory Co., Ltd.
$FeC_2O_4 \cdot 2H_2O$: Junsei Chemical Co., Ltd.
$(NH_4)_2HPO_4$: Kanto Chemical Co., Inc.

In a first example, 1.48 g of $Li_2CO_3$, 7.20 g of $FeC_2O_4 \cdot 2H_2O$, and 7.92 g of $(NH_4)_2HPO_4$ are charged into a planetary ball mill container made of tungsten carbide. Then, the planetary ball mill container is set in a ball mill machine. The ball mill machine is driven to mix the raw materials at 400 rpm for 6 hours. The resulting mixture is fired in an argon atmosphere at 600° C. for 6 hours to obtain a positive electrode material having a composition represented by $Li_{5.33}Fe_{5.33}(P_2O_7)_4$ and containing W.

In a second example, for example, a positive electrode material represented by composition formula $Li_{5.33}Fe_{5.33}(P_2O_7)_4$ is obtained in the same manner as in the first example for producing the positive electrode material for secondary batteries, except that the planetary ball mill container is changed to a planetary ball mill container made of zirconia. This synthesis method corresponds to a method for synthesizing a lithium ion pyrophosphate material in Non-Patent Document. For example, in the synthesis in Non-Patent Document, a planetary ball mill container made of zirconia is used.

In a third example, for example, a positive electrode material represented by composition formula $Li_{5.33}Fe_{5.33}(P_2O_7)_4$ is obtained in the same manner as in the first example, except that the planetary ball mill container is changed to a planetary ball mill container made of agate.

Figure 2:
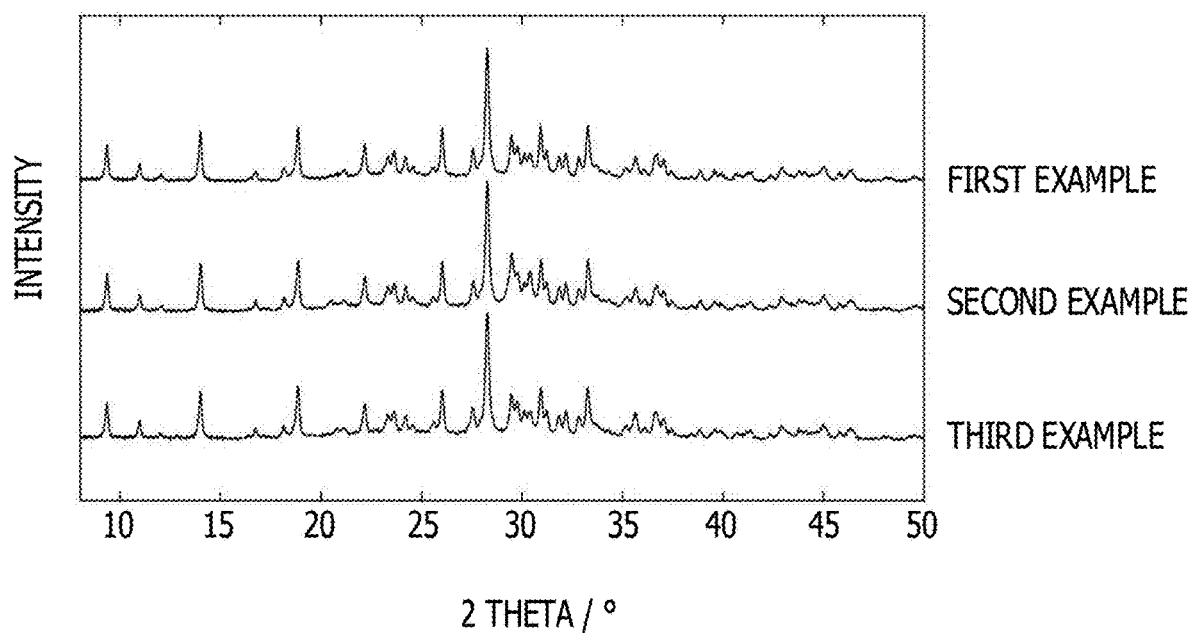
FIG. 2 illustrates examples of XRD spectra of positive electrode materials.

FIG. 2 illustrates XRD spectra (by Cu-Kα characteristic X-rays) of the positive electrode materials obtained in the first, second, and third examples. The appearance of diffraction peaks indicates the presence of crystal structures. The production of the positive electrode material for secondary batteries, the first example, and the second example provide substantially the same diffraction profile. As a result of Rietveld analysis, it is found that all the positive electrode materials have a triclinic crystal phase and belong to space group P-1 (No. 2).

For the positive electrode materials obtained in the first, second, and third examples, the contents of W, Zr, and Si are evaluated by ICP elemental analysis. This is performed in order to check the degree of mixing of the material for the ball mill container in the positive electrode material. Si is a main element constituting agate. In the positive electrode material synthesized in the first example, 0.29±0.07 mass % of W is detected. In the positive electrode materials synthesized in the second and third examples, an element (Zr or Si) derived from the material for the ball mill container is not detected. The results are obtained by synthesizing each of the positive electrode materials five times under the same conditions. When a region of 0.29±0.07 is assumed to be a 1σ region, the 3σ region is 0.08 to 0.50.

A half-cell is produced using each of the positive electrode materials (positive electrode active materials) obtained in the first, second, and third examples. The positive electrode is a mixture containing the positive electrode active material, conductive carbon (Ketjenblack, Lion Corporation, ECP600JD), and polyvinylidene fluoride (Kureha Corporation, KF #1300) at a mass ratio (positive electrode active material:conductive carbon:polyvinylidene fluoride) of 85:10:5. The electrolytic solution is a solution (purchased from Kishida Chemical Co., Ltd.) produced by dissolving 1 M lithium hexafluorophosphate ($LiPF_6$) in a mixed solvent (EC:DMC=1:2, v/v) of ethylene carbonate (EC) and dimethyl carbonate (DMC). The negative electrode is metallic lithium.

Figure 3:
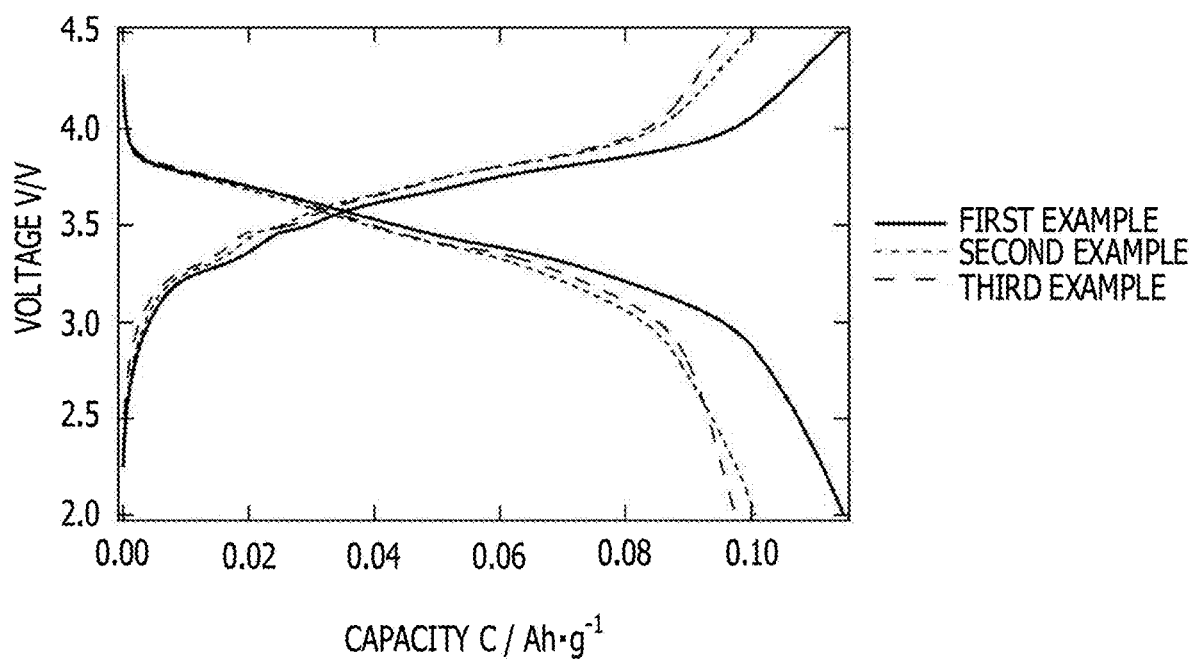
FIG. 3 illustrates examples of constant-current charge-discharge curves of half-cells produced using positive electrode materials.

A constant-current charge-discharge test is performed on the produced half-cell under the following conditions. Both charging and discharging are terminated when the voltage reaches a certain voltage. The charging is terminated at 4.5 V and the discharging is terminated at 2.0 V. An interval of 10 minutes is put between the charging and the discharging in an open-circuit state. FIG. 3 illustrates the results. The half-cell produced using the positive electrode material obtained in the first example has a capacity of about 115 mAh/g. The half-cells produced using the positive electrode materials obtained in the second and third examples have a capacity of about 100 mAh/g. Thus, it is confirmed that the capacity of the positive electrode material obtained in the first example is improved by about 15% compared with the capacities of the positive electrode materials obtained in the second and third examples. In the positive electrode material obtained in the first example, when the oxidation-reduction reaction ($W \leftrightarrow W^{6+}$) of tungsten (W) is assumed to contribute to an improvement in the capacity, the percentage of the contribution of the oxidation-reduction reaction of W to an improvement in the capacity is estimated to be 0.3%. The reason for the improvement in the capacity in the first example is that the crystal structure of the positive electrode material is stabilized by adding W, which improves the capacity of the positive electrode material itself.

In a fourth example, a positive electrode material is obtained in the same manner as in the first example, except that the driving conditions of the ball mill machine are changed from 6 hours at 400 rpm to 24 hours at 400 rpm.

The crystal structure is analyzed in the same manner as in the first example. As a result, substantially the same diffraction profile as in the first example appears, and the positive electrode material has a triclinic crystal phase and belongs to space group P-1 (No. 2).

The W content is determined by ICP elemental analysis in the same manner as in the first example. Consequently, 1.4±0.2 mass % of W is detected. The result is obtained by performing synthesis five times under the same conditions. When a region of 1.4±0.2 is assumed to be a 1σ region, the 3σ region is 0.8 to 2.0.

A half-cell is produced in the same manner as in the first example.

A constant-current charge-discharge test is performed in the same manner as in the first example. The capacity is about 116 mAh/g.

In a fifth example, 1.48 g of $Li_2CO_3$, 7.20 g of $FeC_2O_4 \cdot 2H_2O$, 7.92 g of $(NH_4)_2HPO_4$, and 0.01 g of tungsten powder are charged into a planetary ball mill container made of zirconia. Then, the planetary ball mill container is set in a ball mill machine. The ball mill machine is driven to mix the raw materials at 400 rpm for 6 hours. The resulting mixture is fired in an argon atmosphere at 600° C. for 6 hours to obtain a positive electrode material having a composition represented by $Li_{5.33}Fe_{5.33}(P_2O_7)_4$ and containing W.

The W content is determined by ICP elemental analysis in the same manner as in the first example. Consequently, 0.20±0.03 mass % of W is detected. The result is obtained by performing synthesis five times under the same conditions. When a region of 0.20±0.03 is assumed to be a 1σ region, the 3σ region is 0.11 to 0.29.

A half-cell is produced in the same manner as in the first example.

A constant-current charge-discharge test is performed in the same manner as in the first example. Consequently, the capacity is about 111 mAh/g.

For example, a positive electrode material for secondary batteries (not containing W) that is represented by composition formula $Li_{4+x}Fe_{4+y}(P_2O_7)_3$ (−0.80≤x≤0.60, −0.30≤y≤0.40, and −0.30≤x+y≤0.30) and has a triclinic crystal structure is produced and evaluated.

In a sixth example, 1.48 g of $Li_2CO_3$, 7.20 g of $FeC_2O_4 \cdot 2H_2O$, and 7.92 g of $(NH_4)_2HPO_4$ are charged into a planetary ball mill container made of zirconia. Then, the planetary ball mill container is set in a ball mill machine. The ball mill machine is driven to mix the raw materials at 400 rpm for 6 hours. The resulting mixture is fired in an argon atmosphere at 600° C. for 6 hours to obtain a positive electrode material represented by $Li_{5.33}Fe_{5.33}(P_2O_7)_4$.

Figure 4:
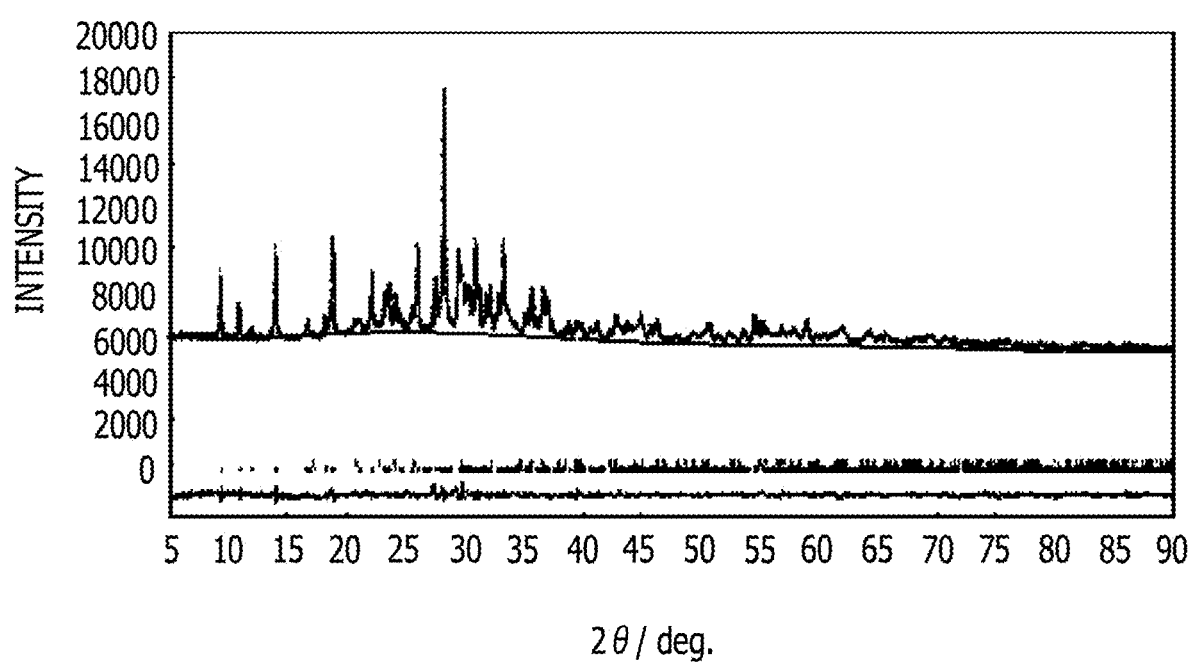
FIG. 4 illustrates an example of an XRD spectrum of a product.

FIG. 4 illustrates an XRD spectrum (by Cu-Kα characteristic X-rays) of the obtained substance. Since diffraction peaks appear, the positive electrode material has a crystal structure. As a result of Rietveld analysis, the positive electrode material has a triclinic crystal phase and belongs to space group P-1 (No. 2). The lattice constant is as follows.

Lattice constant
a=6.34 Å
b=8.50 Å
c=9.95 Å
α=107.9°
β=89.82°
γ=93.02°

Figure 5:
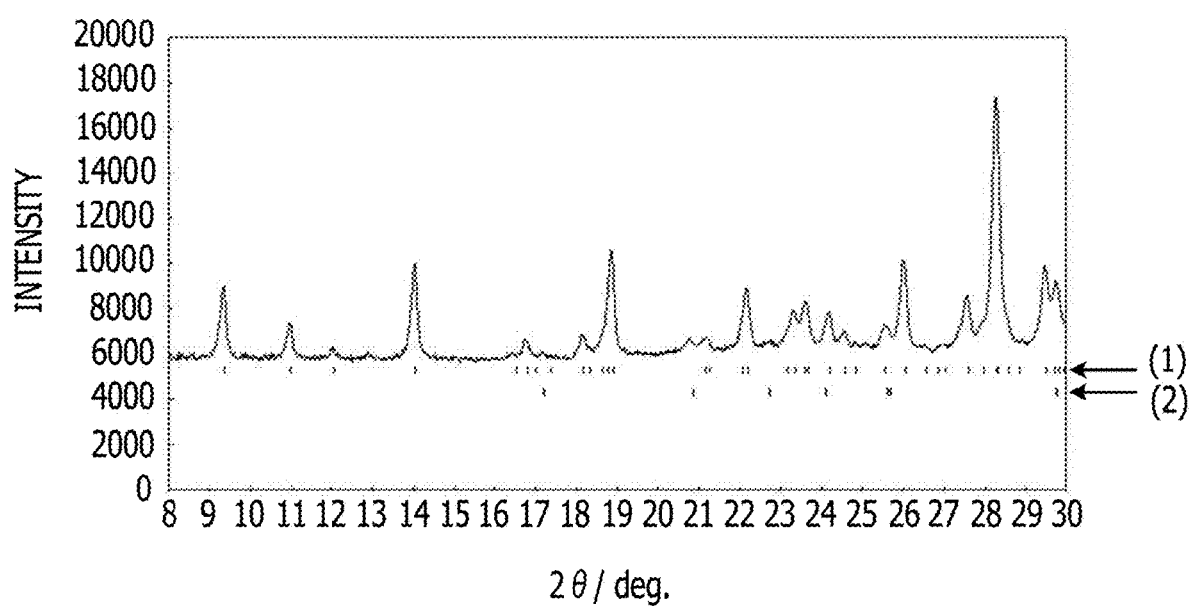
FIG. 5 illustrates examples of diffraction peaks of the XRD spectrum at smaller angles.
Figure 6A:
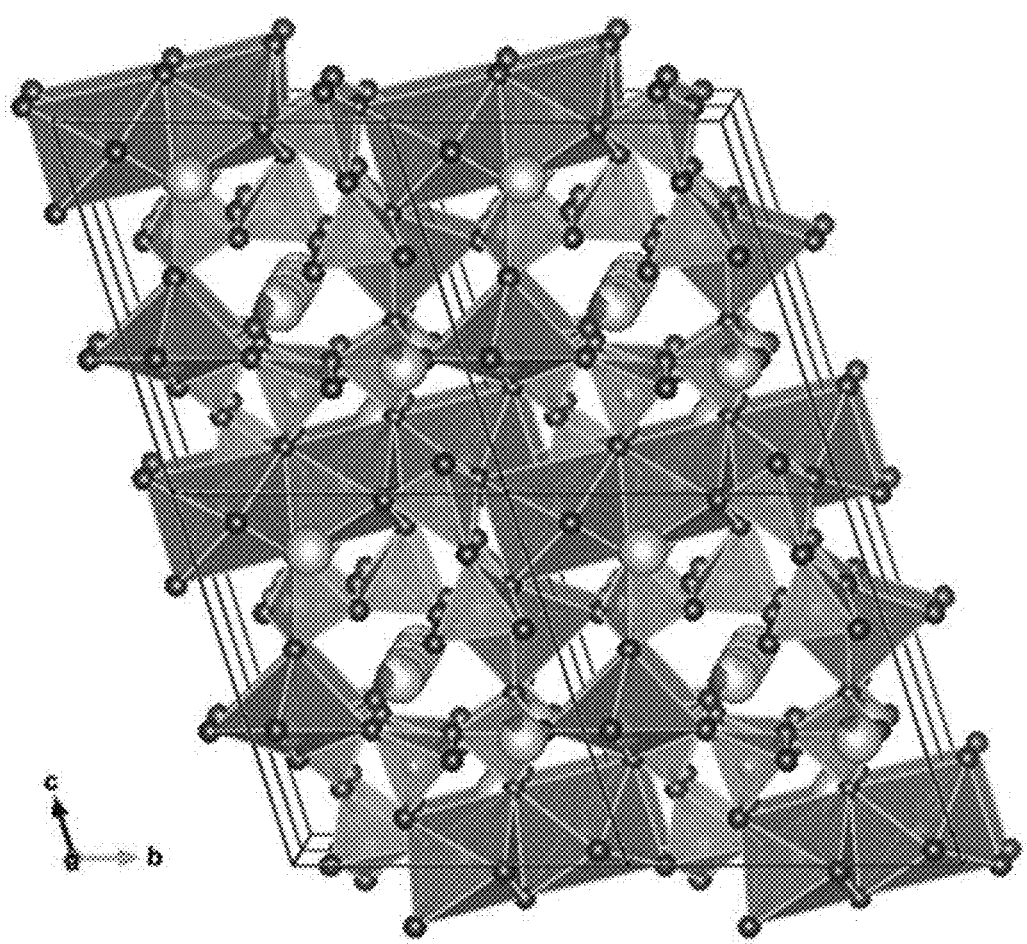
FIGS. 6A and 6B illustrate an example of a triclinic crystal structure of a main product.
Figure 6B:
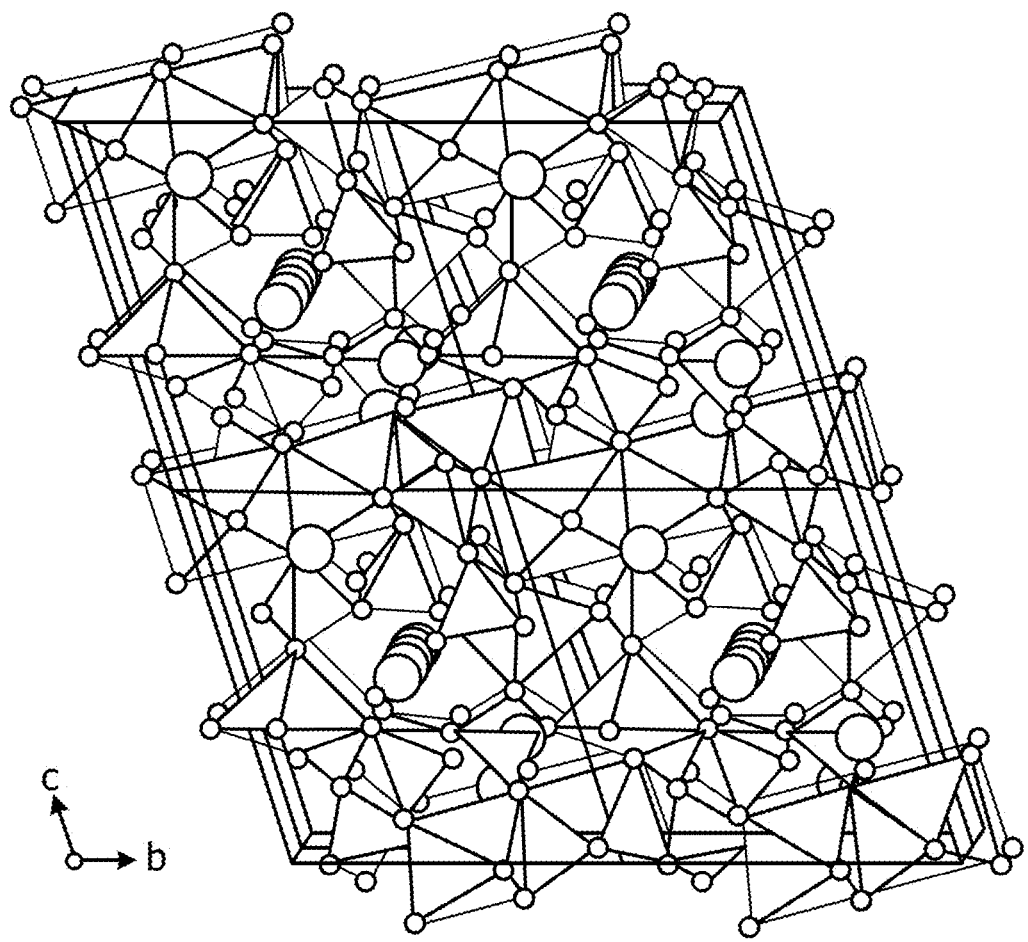

The purity is 96 mass %, and diffraction peaks that indicate 4 mass % of $LiFePO_4$ serving as an impurity phase are detected. FIG. 5 and Table 1 illustrate the results of indexing of the diffraction peaks at smaller angles. FIGS. 6A and 6B illustrate the appearance of the crystal structure. Table 2 illustrates parameters of the crystal structure. In FIG. 5, (1) indicates 2θ of diffraction peaks of $Li_{5.33}Fe_{5.33}(P_2O_7)_4$ (triclinic) and (2) indicates 2θ of diffraction peaks of $LiFePO_4$.

TABLE 1

| 2θ/deg. | d/Å | h | k | l |
|---|---|---|---|---|
| 9.38 | 9.473 | 0 | 0 | 1 |
| 11.00 | 8.078 | 0 | 1 | 0 |
| 12.06 | 7.365 | 0 | 1 | −1 |
| 14.05 | 6.326 | 1 | 0 | 0 |
| 16.51 | 5.384 | 0 | 1 | 1 |
| 16.80 | 5.294 | 1 | 0 | −1 |
| 17.01 | 5.228 | 1 | 0 | 1 |
| 17.38 | 5.117 | 1 | −1 | 0 |
| 18.18 | 4.894 | 1 | −1 | 1 |
| 18.33 | 4.854 | 1 | 1 | 0 |
| 18.63 | 4.776 | 0 | 1 | −2 |
| 18.79 | 4.736 | 0 | 0 | 2 |
| 18.90 | 4.709 | 1 | 1 | −1 |
| 21.15 | 4.212 | 0 | 2 | −1 |
| 21.25 | 4.192 | 1 | −1 | −1 |
| 22.06 | 4.039 | 0 | 2 | 0 |
| 22.20 | 4.014 | 1 | 1 | 1 |
| 23.19 | 3.846 | 1 | −1 | 2 |
| 23.36 | 3.817 | 1 | 0 | −2 |
| 23.60 | 3.779 | 1 | 1 | −2 |
| 23.68 | 3.767 | 1 | 0 | 2 |
| 24.23 | 3.683 | 0 | 2 | −2 |
| 24.60 | 3.628 | 0 | 1 | 2 |
| 24.86 | 3.591 | 1 | −2 | 1 |
| 25.57 | 3.491 | 1 | −2 | 0 |
| 26.06 | 3.427 | 1 | 2 | −1 |
| 26.58 | 3.361 | 0 | 2 | 1 |
| 26.89 | 3.323 | 1 | 2 | 0 |
| 27.04 | 3.306 | 0 | 1 | −3 |
| 27.61 | 3.238 | 1 | −2 | 2 |
| 27.98 | 3.196 | 1 | −1 | −2 |
| 28.28 | 3.163 | 2 | 0 | 0 |
| 28.33 | 3.158 | 0 | 0 | 3 |
| 28.58 | 3.130 | 1 | 2 | −2 |
| 28.86 | 3.101 | 1 | 1 | 2 |
| 29.53 | 3.032 | 1 | −2 | −1 |
| 29.72 | 3.013 | 2 | 0 | −1 |
| 29.84 | 3.001 | 2 | −1 | 0 |
| 29.98 | 2.988 | 2 | 0 | 1 |

TABLE 2

| | | x | y | z | Occ. | U | Site | Sym. |
|---|---|---|---|---|---|---|---|---|
| 1 Fe | Fe5 | 0.5 | 0.5 | 0 | 0.922 | 0.01 | 1e | −1 |
| 2 Fe | Fe6 | 0.6499 | 0.1196 | −0.0601 | 0.976 | 0.01 | 2i | 1 |
| 3 Fe | Fe7 | 0.3142 | 0.8887 | 0.6479 | 0.963 | 0.01 | 2i | 1 |
| 4 P | P1 | 0.529 | 0.2447 | 0.685 | 1 | 0.011 | 2i | 1 |
| 5 P | P2 | 0.149 | 0.214 | 0.0189 | 1 | 0.011 | 2i | 1 |
| 6 P | P3 | 0.266 | 0.54 | 0.7383 | 1 | 0.011 | 2i | 1 |
| 7 P | P4 | 0.185 | 0.193 | 0.3169 | 1 | 0.011 | 2i | 1 |
| 8 Li | Li1 | 0.03 | 0.192 | 0.661 | 0.854 | 0.12 | 2i | 1 |
| 9 Fe | Fe1 | 0.03 | 0.192 | 0.661 | 0.146 | 0.01 | 2i | 1 |
| 10 Li | Li2 | 0.5 | 0.5 | 0.5 | 1 | 0.12 | 1h | −1 |
| 11 Li | Li3 | −0.08 | 0.348 | 0.842 | 1 | 0.12 | 2i | 1 |
| 12 Li | Li4 | 0 | 0.5 | 0.5 | 0.625 | 0.12 | 1g | −1 |
| 13 Fe | Fe4 | 0 | 0.5 | 0.5 | 0.242 | 0.01 | 1g | −1 |

TABLE 2-continued

| | | x | y | z | Occ. | U | Site | Sym. |
|---|---|---|---|---|---|---|---|---|
| 14 | O | O1 | 0.237 | 0.373 | 0.413 | 1 | 0.007 | 2i | 1 |
| 15 | O | O2 | 0.46 | 0.419 | 0.665 | 1 | 0.007 | 2i | 1 |
| 16 | O | O3 | 0.228 | 0.384 | 0.025 | 1 | 0.007 | 2i | 1 |
| 17 | O | O4 | −0.042 | 0.16 | −0.081 | 1 | 0.007 | 2i | 1 |
| 18 | O | O5 | 0.643 | −0.092 | 0.739 | 1 | 0.007 | 2i | 1 |
| 19 | O | O6 | 0.383 | 0.711 | 0.181 | 1 | 0.007 | 2i | 1 |
| 20 | O | O7 | −0.014 | −0.082 | 0.635 | 1 | 0.007 | 2i | 1 |
| 21 | O | O8 | 0.323 | 0.085 | −0.027 | 1 | 0.007 | 2i | 1 |
| 22 | O | O9 | 0.329 | 0.132 | 0.652 | 1 | 0.007 | 2i | 1 |
| 23 | O | O10 | 0.072 | 0.426 | 0.72 | 1 | 0.007 | 2i | 1 |
| 24 | O | O11 | 0.295 | 0.799 | 0.432 | 1 | 0.007 | 2i | 1 |
| 25 | O | O12 | −0.089 | 0.818 | 0.832 | 1 | 0.007 | 2i | 1 |
| 26 | O | O13 | 0.314 | 0.634 | 0.886 | 1 | 0.007 | 2i | 1 |
| 27 | O | O14 | 0.274 | 0.646 | 0.646 | 1 | 0.007 | 2i | 1 |

Figure 7:
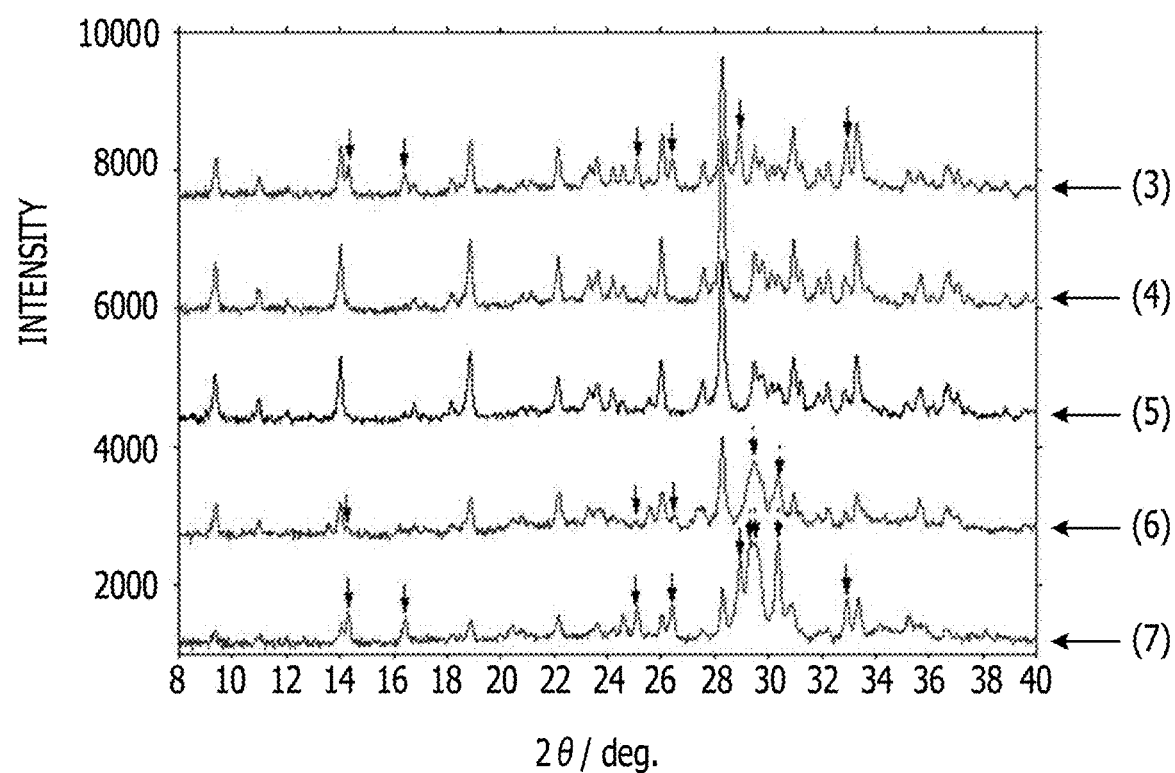
FIG. 7 illustrates examples of XRD spectra obtained by changing an Fe content.

In a sixth example, the Fe and Li contents in $Li_{5.33}Fe_{5.33}(P_2O_7)_4$ are changed, and the resulting changes in XRD spectra are checked. FIG. 7 illustrates the results. Arrows in the charts indicate diffraction peaks of impurities.

The charts indicate the following compositions from above.

(3): $Li_{6.0}Fe_{5.0}(P_2O_7)_4$ [$Li_{4.50}Fe_{3.75}(P_2O_7)_3$]
(4): $Li_{5.6}Fe_{5.2}(P_2O_7)_4$ [$Li_{4.20}Fe_{3.90}(P_2O_7)_3$]
(5): $Li_{5.33}Fe_{5.33}(P_2O_7)_4$ [$Li_{4.00}Fe_{4.00}(P_2O_7)_3$]
(6): $Li_{5.0}Fe_{5.5}(P_2O_7)_4$ [$Li_{3.75}Fe_{4.13}(P_2O_7)_3$]
(7): $Li_{4.6}Fe_{5.7}(P_2O_7)_4$ [$Li_{3.45}Fe_{4.28}(P_2O_7)_3$]

As is clear from FIG. 7, the positive electrode material having a composition represented by $Li_{5.33}Fe_{5.33}(P_2O_7)_4$ has the highest purity, followed by the positive electrode material having a composition represented by $Li_{5.6}Fe_{5.2}(P_2O_7)_4$ that contains the second smallest amount of impurities.

Table 3 collectively illustrates the above results.

TABLE 3

| | Relative to $(P_2O_7)_3$ | | | |
|---|---|---|---|---|
| | Li | Fe | Li + Fe | (Li + Fe) − 8.00 |
| (3) $Li_{6.0}Fe_{5.0}(P_2O_7)_4[Li_{4.50}Fe_{3.75}(P_2O_7)_3]$ | 4.50 | 3.75 | 8.25 | 0.25 |
| (4) $Li_{5.6}Fe_{5.2}(P_2O_7)_4[Li_{4.20}Fe_{3.90}(P_2O_7)_3]$ | 4.20 | 3.90 | 8.10 | 0.10 |
| (5) $Li_{5.33}Fe_{5.33}(P_2O_7)_4[Li_{4.00}Fe_{4.00}(P_2O_7)_3]$ | 4.00 | 4.00 | 8.00 | 0.00 |
| (6) $Li_{5.0}Fe_{5.5}(P_2O_7)_4[Li_{3.75}Fe_{4.13}(P_2O_7)_3]$ | 3.75 | 4.13 | 7.88 | −0.13 |
| (7) $Li_{4.6}Fe_{5.7}(P_2O_7)_4[Li_{3.45}Fe_{4.28}(P_2O_7)_3]$ | 3.45 | 4.28 | 7.73 | −0.28 |

The three-digit numbers of Li and Fe in Table 3 are values rounded off to two decimal places.

In a seventh example, $Li_4P_2O_7$ having a crystal structure and $Fe_2P_2O_7$ having a crystal structure are weighed at a molar ratio of $Li_4P_2O_7:Fe_2P_2O_7=1:2$ and mixed with each other using a mortar to obtain a substance having an overall composition of $Li_{5.33}Fe_{5.33}(P_2O_7)_4$.

As a result of the XRD measurement of the obtained substance, diffraction peaks are detected and thus the substance is found to have a crystal structure. Furthermore, crystal phases are identified from the positions of the diffraction peaks. Consequently, the substance is found to be a mixture of a $Li_4P_2O_7$ crystal phase (JCPDS card No. 01-077-0145) and an $Fe_2P_2O_7$ crystal phase (JCPDS card No. 01-076-1762).

In an eighth example, a half-cell is produced using the positive electrode material (positive electrode active material) obtained in the first example. The positive electrode is a mixture containing the positive electrode active material, conductive carbon (Ketjenblack, Lion Corporation, ECP600JD), and polyvinylidene fluoride (Kureha Corporation, KF #1300) at a mass ratio (positive electrode active material:conductive carbon:polyvinylidene fluoride) of 85:10:5. The electrolytic solution is a solution (purchased from Kishida Chemical Co., Ltd.) produced by dissolving 1 M lithium hexafluorophosphate ($LiPF_6$) in a mixed solvent (EC:DMC=1:2, v/v) of ethylene carbonate (EC) and dimethyl carbonate (DMC). The negative electrode is metallic lithium.

A constant-current charge-discharge test is performed on the produced half-cell under the following conditions. Both charging and discharging are terminated when the voltage reaches a certain voltage. The charging is terminated at 4.5 V and the discharging is terminated at 2.0 V. An interval of 10 minutes is put between the charging and the discharging in an open-circuit state.

Figure 8A:
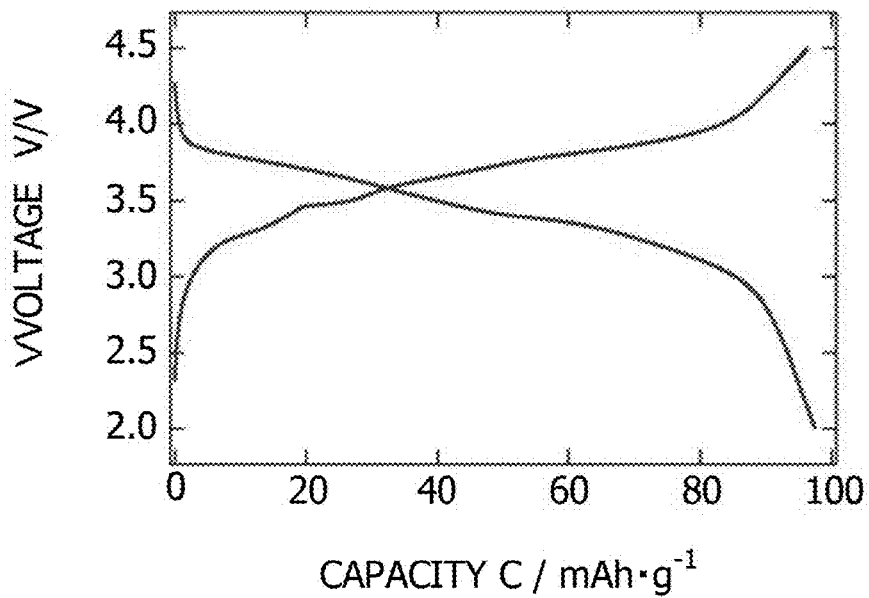
FIG. 8A illustrates an example of a constant-current charge-discharge curve of a half-cell produced using a positive electrode material.
Figure 8B:
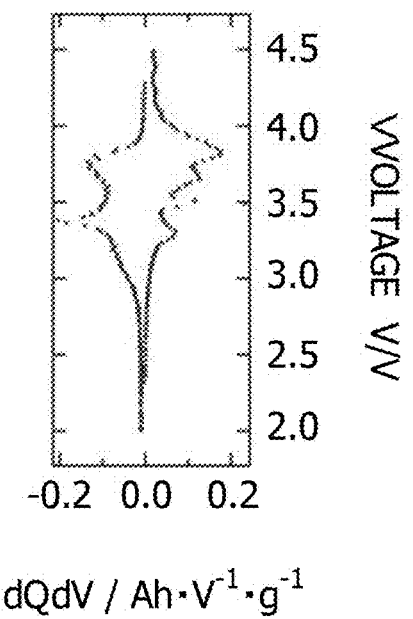
FIG. 8B illustrates an example of a dQ/dV plot derived from the constant-current charge-discharge curve.

It is confirmed that the produced half-cell has a capacity of about 100 mAh/g for both charging and discharging. FIG. 8A illustrates an example of a constant-current charge-discharge curve. FIG. 8B illustrates an example of a dQ/dV plot derived from the constant-current charge-discharge curve. Peaks that appear in the dQ/dV plot indicate plateau regions in the constant-current charge-discharge curve. The highest-voltage plateau region in the charge peaks is 3.81 V. The highest-voltage plateau region in the discharge peaks is 3.77 V. Thus, the positive electrode material obtained in the eighth example is a positive electrode material having a maximum voltage of 3.79 V in terms of average voltage.

In a ninth example, a half-cell is produced in the same manner as in the eighth example, except that the positive electrode material in the eighth example is changed to the substance produced in the seventh example. A constant-current charge-discharge test is performed on the produced half-cell in the same manner as in the eighth example.

However, either the charge capacity or the discharge capacity is substantially not observed (<0.1 mAh/g).

As is clear from the results in the eighth example and the ninth example, to achieve a high potential of 3.8 V, it is not sufficient that the positive electrode material only has a composition represented by $Li_{4+x}Fe_{4+y}(P_2O_7)_3$ (−0.80≤x≤0.60, −0.30≤y≤0.40, and −0.30≤x+y≤0.30), and it is desired to have a triclinic crystal structure. For example, when two materials $Li_4P_2O_7$ and $Fe_2P_2O_7$ each having a crystal structure are mixed with each other at a molar ratio of 1:2, a material represented by composition formula $Li_{5.33}Fe_{5.33}(P_2O_7)_4$ is produced. In this case, however, a high potential of 3.8 V is not achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of producing a positive electrode material for a secondary battery, the method comprising:
   producing a mixture of a lithium source, an iron source, a phosphoric acid source, and a tungsten source;
   heat-treating the mixture; and
   producing the positive electrode material for the secondary battery containing the mixture,
   in the producing the mixture, the lithium source, the iron source, and the phosphoric acid source are mixed in a container containing the tungsten source to produce the mixture,
   the tungsten source is tungsten carbide.

2. The method according to claim 1, wherein in the producing the mixture, the lithium source, the iron source, the phosphoric acid source, and the tungsten source are mixed to produce the mixture.

3. The method according to claim 1, wherein the heat-treating the mixture is performed at a temperature of 470° C. or higher and 720° C. or lower.

4. The method according to claim 1, wherein the heat-treating the mixture is performed in an inert atmosphere.

* * * * *